L. H. BUCKNER.
CONNECTING MEANS FOR HUBS AND AXLES.
APPLICATION FILED NOV. 27, 1916. RENEWED NOV. 7, 1918.
1,306,519.
Patented June 10, 1919.
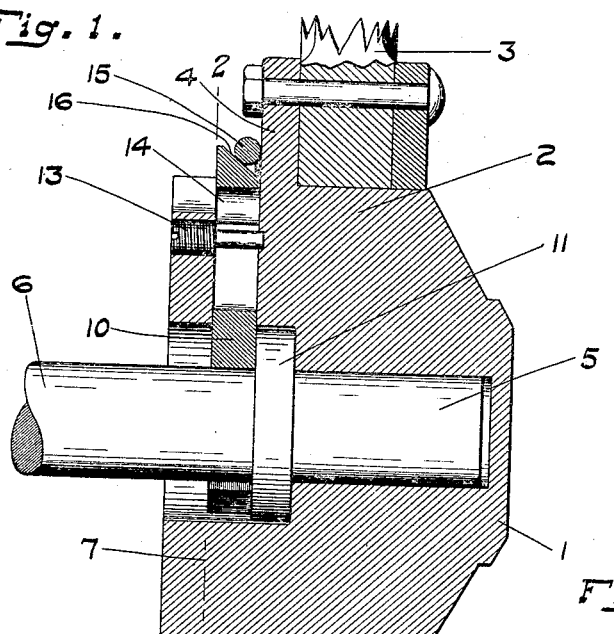
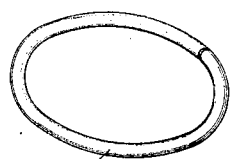
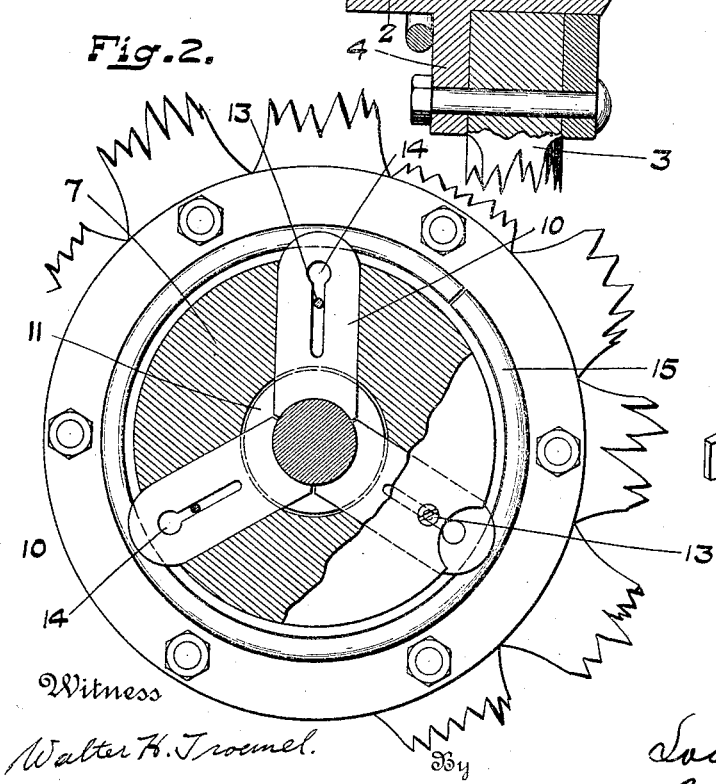
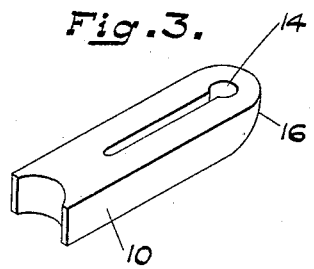
Witness
Walter H. Troemel.
Inventor
Louis H. Buckner
Bradford & Doolittle
Attorneys

UNITED STATES PATENT OFFICE.

LOUIS H. BUCKNER, OF INDIANAPOLIS, INDIANA.

CONNECTING MEANS FOR HUBS AND AXLES.

1,306,519.   Specification of Letters Patent.   Patented June 10, 1919.

Application filed November 27, 1916, Serial No. 133,695. Renewed November 7, 1918. Serial No. 261,549.

*To all whom it may concern:*

Be it known that I, LOUIS H. BUCKNER, a citizen of the United States, residing at Indianapolis, Marion county, and State of Indiana, have invented and discovered certain new and useful Improvements in Connecting Means for Hubs and Axles, of which the following is a specification.

My invention relates to connecting means for hubs and axles and its object is to provide a construction that will enable the hub to be quickly attached to and detached from the axle, that will accomplish such function by a construction having only a small number of parts and including an integral hub, providing an outside cup, a spoke retaining flange and a bearing part, and serving to retain the grease, and the invention further contemplates the provision of means for holding the attaching elements in place, that are readily accessible for release.

With these objects and others in view, my invention is embodied in preferable form in the construction hereinafter described and illustrated in the accompanying drawings.

In these drawings, Figure 1 is a vertical longitudinal section of a hub and an axle showing my improvements applied thereto, Fig. 2, a section on the line 2—2 of Fig. 1; Fig. 3, a detail of one of the locking members and Fig. 4, a detail of the fastening spring.

Referring to the drawings, 1 is a part of the hub constituting the outer butt cap, 2 the spoke socket ring, 3 the spokes and 4 the spoke plate or flange which parts are made in one piece as distinguished from the usual construction which has a separate screw cap or nut at the outer end. This one piece member is adapted to bear on the spindle 5 of the axle 6.

Preferably formed integrally with the flange 4 is an inwardly projecting collar or ring 7. Radial slots 9 are formed in the rings 7 and in these slots are mounted radially sliding dogs 10 adapted to be projected toward and from the axle, behind a retaining collar 11 fixed on the axle. These dogs are provided with curved inner ends adapted to fit against the periphery of the axle, and preferably they are sufficiently wide to extend entirely around the axle circumference. The dogs are provided with longitudinal slots adapted to be engaged by screw pins 13 constituting stops to limit the outward movement of the dogs. These slots terminate at their outer ends in enlarged holes 14, adapted to receive the end of a pin or nail by which the dogs may be readily withdrawn.

Adapted to hold the dogs in their locking positions is a resilient, releasable, fastening member, consisting of a split, spring wire ring 15 surrounding the dogs and bearing against shoulders 16 at the outer ends thereof and serving to press the dogs in against the axle to hold them behind the collar 11.

In the use of the invention, the hub with the wheel attached thereto is slid over the spindle of the axle with the locking dogs projected outwardly, in which position two of the dogs will be retained by gravity and the upper dog may be retained by the engagement of a pin or nail in the hand of the user. The hub is slid in on the axle until the dogs pass the fixed axle collar 11, whereupon the dogs are forced in until they bear against the axle behind the collar. The locking ring 15 is then sprung over the ends of the locking dogs holding them firmly in position behind the collar 11. When it is desired to remove the wheel it is merely necessary to pry off the locking ring 15 from the hub and out of engagement with the locking dogs whereupon the latter may be readily slid out radially to release them from engagement with the collar 11, whereupon the hub and wheel may be slid off from the axle.

It will be seen that this construction not only avoids the use of a separate outside nut or cap for the hub but also provides effective means for retaining the grease within the hub and enables the entire hub body to be made of a single integral piece of metal.

Having thus described my said invention, what I claim is:—

1. In combination with a hub and an axle, a collar fixed on said axle, a series of radially sliding dogs mounted on said hub and adapted to be projected into line with said collar and a yielding spring gripping ring mounted exteriorly of said dogs and adapted to surround and press against the same to hold them projected inwardly behind the collar, said ring being accessible from the exterior of the hub to permit the removal thereof.

2. In combination with an axle, a hub made of an integral body and having an outer axle-end inclosing cap, a bearing portion, a spoke-receiving portion and a locking member receiving portion, said axle having a circumferential collar fixed thereon, radially sliding locking dogs carried by said hub and adapted to be projected behind said collar and withdrawn beyond the edge thereof and a split spring locking ring adapted to surround said dogs and bear upon their outer ends, said ring being exposed to view and accessible from the exterior of the hub.

3. In combination with a hub and an axle, a collar fixed on said axle, radially sliding dogs mounted on said hub and adapted to engage said collar, said dogs being provided with longitudinal slots, and stop pins carried by said hub and engaging said slots and a split spring ring loosely mounted around the hub and bearing against the ends of the dogs to exert an inward radial pressure thereon to hold the same in locking position.

In witness whereof I have hereunto set my hand and seal at Indianapolis, Marion county, Indiana, this 23rd day of November, A. D. nineteen hundred and sixteen.

LOUIS H. BUCKNER. [L. S.]

Witnesses:
LAURA LANE,
MARY L. MITCHELL.

Copies of this patent may be obtained for five cents each, by addressing the "Commissioner of Patents, Washington, D. C."